(12) United States Patent
Hanzawa (10) Patent No.: US 7,167,304 B2
(45) Date of Patent: Jan. 23, 2007

(54) BINOCULAR STEREOSCOPIC OBSERVATION APPARATUS, ELECTRONIC IMAGE STEREOMICROSCOPE, ELECTRONIC IMAGE STEREOSCOPIC OBSERVATION APPARATUS, AND ELECTRONIC IMAGE OBSERVATION APPARATUS

(75) Inventor: Toyoharu Hanzawa, Mitaka (JP)

(73) Assignee: Olympus Corporation, Tokyo (JP)

( * ) Notice: Subject to any disclaimer, the term of this patent is extended or adjusted under 35 U.S.C. 154(b) by 178 days.

(21) Appl. No.: 11/042,211

(22) Filed: Jan. 26, 2005

(65) Prior Publication Data

US 2005/0128287 A1 Jun. 16, 2005

(51) Int. Cl.
*G02B 21/22* (2006.01)
(52) U.S. Cl. .................. 359/377; 359/363; 359/379
(58) Field of Classification Search ........ 359/372–378, 359/379, 363
See application file for complete search history.

(56) References Cited

U.S. PATENT DOCUMENTS

| 6,525,878 B1* | 2/2003 | Takahashi .................. 359/466 |
| 2004/0017607 A1* | 1/2004 | Hauger et al. ............... 359/376 |

FOREIGN PATENT DOCUMENTS

| JP | 2000-214413 | 8/2000 |
| JP | 2000-341473 | 12/2000 |
| JP | 2001066513 A * | 3/2001 |

\* cited by examiner

*Primary Examiner*—Mark A. Robinson
*Assistant Examiner*—Scott Stephens
(74) *Attorney, Agent, or Firm*—Kenyon & Kenyon LLP (57) ABSTRACT

A binocular stereoscopic observation apparatus includes an imaging section forming left and right images with parallax in at least two directions and an observing section in which the images with parallax are stereoscopically observed with a viewer's eyes. In this case, the imaging section has an imaging lens forming images of an object at imaging positions on each of left and right optical paths and i imaging positions on the optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to the jth imaging position, Ek is a difference between distances, measured along the optical axis, from adjacent imaging positions to the imaging lens, and Dd is an image-side depth of an optical system of the imaging section. The observing section has an eyepiece optical system and i display devices on each of the left and right optical paths so that an image formed at the jth imaging position from the imaging lens on each optical path of the imaging section is displayed on the jth display device from the eyepiece optical system on a corresponding optical path, satisfying the following condition:

$$M_j < M_{(j-1)}$$

where $M_j$ is a distance, measured along the optical axis, from the eyepiece optical system to the jth display device. The observing section further has means for superimposing i displayed images on a viewer's pupil. Here, i is an integer of 2 or more and j is an integer satisfying conditions, $1 \leq j \leq i$ and $j \geq 2$.

13 Claims, 8 Drawing Sheets

BINOCULAR STEREOSCOPIC OBSERVATION APPARATUS, ELECTRONIC IMAGE STEREOMICROSCOPE, ELECTRONIC IMAGE STEREOSCOPIC OBSERVATION APPARATUS, AND ELECTRONIC IMAGE OBSERVATION APPARATUS

The contents of Application No. 2003-281998 filed on Jul. 29, 2003, in Japan, are hereby incorporated by reference.

BACKGROUND OF THE INVENTION

1. Field of the Invention

This invention relates to a binocular stereoscopic observation apparatus, an electronic image stereomicroscope, an electronic image stereoscopic observation apparatus, and an electronic image observation apparatus that are suitable for the application of work to an object to be observed.

2. Description of Related Art

In conventional practice, a stereomicroscope has been used to perform a surgical operation under a microscope that requires processing work of minute portions and accurate work in a narrow region on the periphery of an affected part. Recently, it has been desired that such work should be carried out by remote control. This is because if the work can be carried out by remote control, the work and the surgical operation can be performed at various places without moving work engineers and surgeons of high order. In order to realize such remote control, it is necessary to electronize an observation image in the stereomicroscope.

Most of commonly used stereoscopic imaging apparatuses are designed so that stereoscopic observations can be made by using binocular parallax that two images with parallax are formed in an imaging section and are observed with the eyes in an observing section. A stereoscopic image obtained by observing such two images with parallax through the eyes is called a "stereo image" in the present invention. In such a stereoscopic imaging apparatus, when the depth of the optical system of the imaging section is enlarged, resolution is impaired, while when an aperture is increased to improve the resolution, the depth of the optical system of the imaging section becomes small. However, the work engineer or surgeon of high order, who observes an optical image, is capable of widening a focus adjusting region by the accommodation of the eye even when the aperture is increased to improve the resolution and the depth of the optical system of the imaging section becomes small. Consequently, in a conventional stereoscopic imaging apparatus, the depth of the optical system is small in the same resolution, but the focusing region of the optical image is widened.

In such a stereo image, it is known that a simple portion corresponding to the two images with parallax (for example, the contour of an object) is good in image reproducibility, but a portion, such as swelling of a smooth object, is bad in reproducibility in the direction of the line of sight. This is called a cardboard effect, and an image largely manifesting this effect appears to be a depth-free image such that a picture is drawn on a flat plate.

Apparatuses and methods for super multiocular observation and hologram in which image information in the direction of the line of sight is obtained have been proposed. Depth-fused three dimensional apparatuses and methods are proposed, for example, in Japanese Patent Kokai Nos. 2000-214413 and 2000-341473.

Kokai No. 2000-214413 discloses that the density of each of a plurality of images arranged in the direction of the line of sight is changed and thereby positions between the plurality of images can be represented. Kokai No. 2000-341473 discloses that blurred images spaced along the optical axis are formed and superimposed for display and thereby information in the direction of the optical axis is obtained and can be recognized as a stereoscopic image.

In general, it has been considered that even when the images are superimposed as mentioned above, the presence of a plurality of images is merely recognized as cardboard-like images. Since it has been assumed that the presence of the blurred images causes image degradation such as a reduction in contrast, processing for eliminating blurred portions has been performed.

However, when the blurred images are actually superimposed in the direction of the line of sight and are observed, they are not recognized and look like a natural stereoscopic image that has no cardboard effect. It is for this reason that the images are arranged in the direction of the line of sight, thereby affording a view similar to a change of the optical image obtained when a focus is altered.

From this, it is considered that a person recognizes an image by a plurality of points with respect to information in the direction of the line of sight and perceives a change in contrast of the image (a change in density of the image) as stereoscopic information. In particular, when at least two images are specified by the parallax of the eyes with respect to their positions, the effect of the stereoscopic image is brought about.

In the case where the stereoscopic image is formed by this technique, the effects of binocular parallax, motion parallax, vergence, and accommodation (the focus adjustment of the eyes) are produced little by little, so that a natural stereoscopic image is obtained and eye strain is relieved accordingly.

SUMMARY OF THE INVENTION

The binocular stereoscopic observation apparatus according to the present invention includes an imaging section forming left and right images with parallax in at least two directions and an observing section in which the images with parallax are stereoscopically observed with a viewer's eyes. In this case, the imaging section has an imaging lens forming images of an object at imaging positions on each of left and right optical paths and i imaging positions on the optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to the jth imaging position, Ek is a difference between distances, measured along the optical axis, from adjacent imaging positions to the imaging lens, and Dd is the image-side depth of the optical system of the imaging section. The observing section has an eyepiece optical system and i display devices on each of the left and right optical paths so that an image formed at the jth imaging position from the imaging lens of each optical path of the imaging section is displayed on the jth display device from the eyepiece optical system on the corresponding optical path, satisfying the following condition:

$$M_j < M_{(j-1)}$$

where $M_j$ is a distance, measured along the optical axis, from the eyepiece optical system to the jth display device. The observing section further has a means for superimposing i displayed images on the viewer's pupil. Here, i is an integer of 2 or more and j is an integer satisfying conditions, $1 \leq j \leq i$ and $j \geq 2$.

The electronic image stereomicroscope according to the present invention includes an imaging section forming left and right images with parallax in at least two directions and an observing section in which the images with parallax are stereo-scopically observed with a viewer's eyes. In this case, the imaging section has an imaging lens forming images of an object at imaging positions on each of left and right optical paths and i imaging positions on the optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to the jth imaging position, Ek is a difference between distances, measured along the optical axis, from adjacent imaging positions to the imaging lens, and Dd is the image-side depth of the optical system of the imaging section. The observing section has an eyepiece optical system and i display devices on each of the left and right optical paths so that an image formed at the jth imaging position from the imaging lens on each optical path of the imaging section is displayed on the jth display device from the eyepiece optical system on the corresponding optical path, satisfying the following condition:

$$M_j < M_{(j-1)}$$

where $M_j$ is a distance, measured along the optical axis, from the eyepiece optical system to the jth display device. The observing section further has a means for superimposing i displayed images on the viewer's pupil, and satisfying the following equation:

$$|L1L - L1R| = Ek/2$$

where L1L is a distance, measured along the optical axis, from the imaging lens in the left optical path to an imaging position closest thereto and L1R is a distance, measured along the optical axis, from the imaging lens in the right optical path to an imaging position closest thereto. Here, i is an integer of 2 or more, j is an integer satisfying conditions, $1 \leq j \leq i$ and $j \geq 2$, and $k = j - 1$.

The electronic image stereomicroscope according to the present invention includes an imaging section forming a plurality of images of an object to be observed and an observing section displaying these images. In this case, the imaging section is provided with an imaging lens forming the images of the object at imaging positions and has i imaging positions on the optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to the jth imaging position, Ek is a difference between distances, measured along the optical axis, adjacent imaging positions to the imaging lens, and Dd is the image-side depth of the optical system of the imaging section. The observing section has an eyepiece optical system and i display devices so that an image formed at the jth imaging position from the imaging lens of the imaging section is displayed on the jth display device from the eyepiece optical system, satisfying the following condition:

$$M_j < M_{(j-1)}$$

where $M_j$ is a distance, measured along the optical axis, from the eyepiece optical system to the jth display device. The observing section further has a means for superimposing i displayed images on the viewer's pupil. A difference between distances, measured along the optical axis, from adjacent display devices to the eye-piece optical system, $Fk = M_{(j-1)} - M_j$, is set so that the absolute values of the longitudinal magnification and the lateral magnification of the optical system of the imaging section become equal. Here, i is an integer of 2 or more, j is an integer satisfying conditions, $1 \leq j \leq i$ and $j \geq 2$, and $k = j - 1$.

These and other features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, the fundamental conception and the function and effect of the present invention will be explained.

In the present invention, the binocular stereoscopic observation apparatus is constructed as described below.

(1) The binocular stereoscopic observation apparatus includes an imaging section forming images with parallax in at least two directions and an observing section in which two images different in imaging direction are stereoscopically observed with a viewer's eyes. In this case, the imaging section is constructed so that a plurality of image sensors are arranged at different imaging positions on the optical axis in each of left and right optical paths and the difference between distances, measured along the optical axis, from adjacent imaging positions to each of imaging lenses arranged in the imaging section is larger than the image-side depth of the optical system of the imaging section. The observing section is constructed so that a plurality of images formed on each of left and right sides in the imaging section are displayed at a plurality of different display positions on each of left and right optical axes along which the viewer observes the images and a plurality of displayed images appear to the viewer to be superimposed. In addition, even when two of images displayed in the observing section are arbitrarily chosen, a distance, measured along the optical axis, from the imaging section to an object surface corresponding to an image appearing close at hand in the observing section is reduced. In the observing section, it is particularly desirable that the difference between distances from adjacent display positions to each eyepiece optical system of the observing section is larger than the depth of the viewer's eye.

In order to superimpose the images at the position of observation of the viewer in the observing section, the optical system of the observing section is designed so that electronic zoom processing is performed with respect to formed images or a position where displayed images appear to be superimposed coincides with the position of the entrance pupil of the optical system of the observing section. When the optical system is such that a set of left and right imaging positions of the imaging section can be integrally shifted and changed so that a plurality of desired objects are brought into focus, an image of good workability can be provided to the viewer.

In particular, when the binocular stereoscopic observation apparatus is a stereomicroscope and the observation of the widest possible region is required, it is good practice to design the microscope as described below.

(2) The electronic image microscope includes an imaging section forming images with parallax in at least two directions and an observing section in which two images different in imaging direction are stereoscopically observed with a viewer's eyes. The imaging section is constructed so that a plurality of image sensors are arranged at different imaging positions on the optical axis in each of left and right optical paths and the difference between distances, measured along the optical axis, from adjacent imaging positions to each of imaging lenses arranged in the imaging section is larger than the image-side depth of the optical system of the imaging section. The observing section is constructed so that a plurality of images formed on each of left and right sides in the imaging section are displayed at a plurality of different display positions on each of left and right optical axes along which the viewer observes the images and a plurality of displayed images appear to the viewer to be superimposed. In addition, a distance, measured along the optical axis, from the imaging section to an object surface corresponding to an image appearing close at hand in the observing section is reduced. In this case, when the diameter of the pupil of the viewer is denoted by Ep, a diopter that the viewer is capable of performing focusing is denoted by s (1/m), the observation wavelength of the viewer is denoted by $\lambda$, and a necessary imaging region on the image side in the imaging section is denoted by R, a difference Ek between distances, measured along the optical axis, from adjacent imaging positions to each of the imaging lenses arranged in the imaging section satisfies the following condition:

$$R \times 2000 \times (\lambda/Ep + 1/1750)/(s \times Ep) \leq Ek \leq R/2$$

Here, a wavelength to which the eyes are most sensitive is substituted for the wavelength $\lambda$. In general, when filters limiting wavelengths are not included, the wavelength $\lambda$ is 550 nm.

In order to make the blurring of images invisible to the eyes, it is desirable to satisfy the following condition:

$$NA' \leq i \times P/R$$

where i is the number of images to be formed in the imaging section, P is the resolution limit of the optical system of the imaging section, and NA' is the exit numerical aperture.

In the stereomicroscope improving the resolution before and behind a portion required for the observation of the object, it is desirable to construct the stereomicroscope as described below.

(3) The electronic image stereomicroscope includes an imaging section forming images with parallax in at least two directions and an observing section in which two images different in imaging direction are stereoscopically observed with a viewer's eyes. The imaging section is constructed so that a plurality of image sensors are arranged at different imaging positions on the optical axis in each of left and right optical paths and a difference Ek between distances, measured along the optical axis, from adjacent imaging positions to each of imaging lenses arranged in the imaging section is larger than the image-side depth of the optical system of the imaging section. The observing section is constructed so that a plurality of images formed on each of left and right sides in the imaging section are displayed at a plurality of different display positions on each of left and right optical axes along which the viewer observes the images and a plurality of displayed images appear to the viewer to be superimposed. In addition, even when two of images displayed in the observing section are arbitrarily chosen, a distance, measured along the optical axis, from the imaging section to an object surface corresponding to an image appearing close at hand in the observing section is reduced. In this case, on the basis of each of the imaging lenses arranged in the imaging section, when a distance, measured along the optical axis, from the imaging lens to an imaging position closest thereto on the left optical path is represented by $L_{1L}$ and a distance, measured along the optical axis, from the imaging lens to an imaging position closest thereto on the right optical path is represented by $L_{1R}$, the left and right imaging positions are shifted so as to satisfy the following condition:

$$|L_{1L}-L_{1R}|=Ek/2$$

Also, when the image-side depth of the optical system of the imaging section is denoted by Dd, the optical system is set to satisfy a condition, $Ek \leq 2Dd$.

In each of Items (2) and (3) also, like Item (1), the optical system of the observing section is designed so that, in order to superimpose the images at the position of observation of the viewer in the observing section, electronic zoom processing is performed with respect to formed images or a position where the images are superimposed is made to coincide with the pupil position of the viewer and the position of the entrance pupil of the optical system of the observing section is adjusted.

The optical system has the characteristic that the longitudinal magnification and the lateral magnification are different to form an unnatural image. This unnatural image refers to an image that when an object to be observed is rotated, a feeling of roughness of the object located at the focal plane is different from that of roughness of the object located before or behind the focal plane, except for a magnification of 1×. In particular, this becomes prominent as the magnification is made higher than 1×. In the present invention, in order to improve this, it is desirable to construct the observation apparatus as described below.

(4) The observation apparatus includes an imaging section forming a plurality of images of an object to be observed and an observing section in which the images are observed by a viewer. The imaging section is constructed so that a plurality of image sensors are arranged at different imaging positions on the optical axis and a difference between distances, measured along the optical axis, from adjacent imaging positions to each of imaging lenses arranged in the imaging section is larger than the image-side depth of the optical system of the imaging section. The observing section is constructed so that a plurality of images formed in the imaging section are displayed at a plurality of different display positions on the optical axis along which the viewer observes the images and the images are superimposed. In this case, a plurality of display devices are arranged in the observing section so that the absolute values of the longitudinal magnification and the lateral magnification of the optical system of the imaging section become equal. In particular, in the stereoscopic observation apparatus in which, like the stereomicroscope, the images with parallax are formed in at least two directions and two images different in imaging direction are displayed and observed, when the image display positions of the observing section are shifted so that the absolute values of the longitudinal magnification and the lateral magnification of the optical system of the imaging section become equal in each direction, the effect of correction for the relationship between the longitudinal magnification and the lateral magnification is large.

When the optical system of Item (4) mentioned above is a zoom optical system, the ratio between the longitudinal magnification and the lateral magnification changes as the magnification is varied. To correct this, either the imaging position of the imaging section or the display position of the observing section, or both, are shifted in association with zooming. In order to achieve a view similar to that of the stereomicroscope in which the relationship between the longitudinal magnification and the lateral magnification is corrected, for example, when the imaging positions are moved so that the absolute values of the longitudinal magnification and the lateral magnification coincide with each other, it is desirable that the optical system is set so that, on the basis of the imaging surface conjugate with the object surface close to the intersection point of the left and right optical axes, other image sensors are moved in association with zooming.

When the distances, measured along the optical axis, between the display positions are changed so that the absolute values of the longitudinal magnification and the lateral magnification coincide with each other, it is favorable that, as in Item (1), the entrance pupil of the optical system of the observing section is adjusted so that displayed images are superimposed and observed and so that the electronic zoom processing is performed with respect to formed images or a position where the images are superimposed practically coincides with the pupil position of the viewer.

In accordance with the drawings, the embodiments of the present invention will be described below.

First Embodiment

Figure 1:
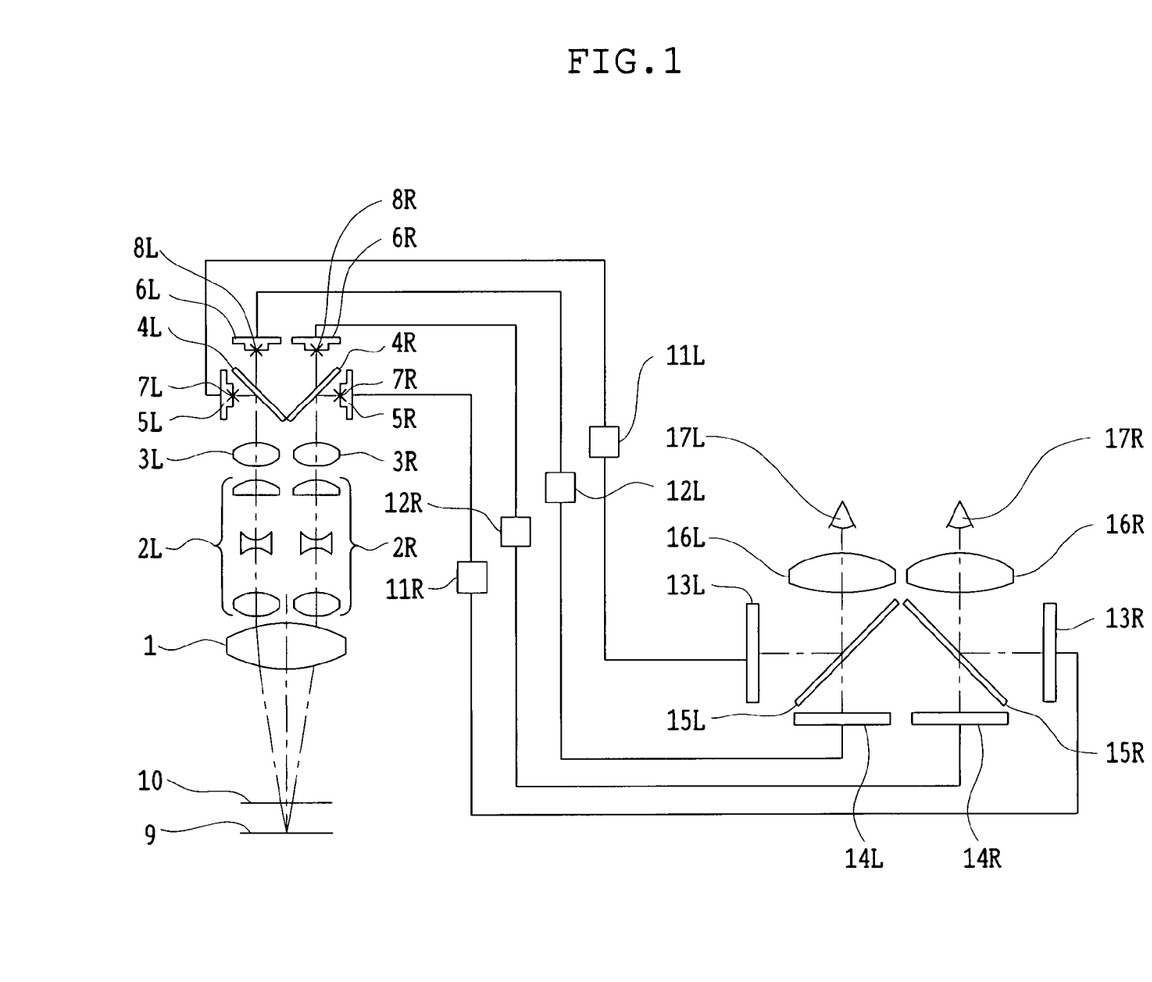
FIG. 1 is a view showing schematically the structure of the binocular stereo-scopic observation apparatus of a first embodiment in the present invention.

FIG. 1 shows the binocular stereoscopic observation apparatus of the first embodiment in the present invention.

The binocular stereoscopic observation apparatus of the first embodiment includes an imaging section forming images of an object to be observed and an observing section in which formed images are observed by a viewer. The imaging section is constructed to have a pair of left and right optical systems forming images with parallax and to form two images at different focus positions in each of the left and right optical systems. The observing section is constructed so that the images formed at the different focus positions in each optical system of the imaging section are displayed at a plurality of display positions and these images are observed with the eyes and thereby are superimposed.

The imaging section has an objective lens 1 and a pair of left and right imaging optical systems that includes a pair of left and right afocal zoom lenses 2L and 2R and a pair of left and right imaging lenses 3L and 3R. The pair of left and right imaging optical systems is constructed so that images are formed at preset left and right imaging positions. Light-splitting elements 4L and 4R are arranged on the exit side of the left and right imaging optical systems, respectively. Image sensors 5L and 5R are arranged on the reflection side of the light-splitting elements 4L and 4R, respectively, and image sensors 6L and 6R are arranged on the transmission side thereof. In order to provide stereoscopic information to the whole imaging region, the image sensors 5L, 5R, 6L, and 6R are arranged so that a point where left and right optical axes cross on the object side is brought to the center of each imaging surface. In the figure, symbol L attached to each reference numeral indicates the left-eye optical path and R indicates the right-eye optical path.

Reference is made to the left-eye optical path. The image sensors 5L and 6L are located at different focus positions of object surfaces relative to imaging surfaces 7L and 8L so that the focus position of the object surface relative to the imaging surface 7L of the image sensor 5L corresponds to the position of an object surface 9 and that of the object surface relative to the imaging surface 8L of the image sensor 6L corresponds to the position of an object surface 10. The imaging positions of the image sensors 5L and 6L are determined so that a difference between distances, measured along the optical axis, from the imaging lens 3L to the image sensors 5L and 6L is larger than the image-side depth of the optical system of the imaging section. It is for this reason that if the image sensors 5L and 6L are located at the imaging positions of similar optical path lengths such that the difference is smaller than the depth, definite information of a change of contrast in the direction of the optical axis cannot be acquired and an image similar to a composite image in which identical images are superimposed is produced so that stereoscopic information is not obtained. An imaging surface 7R of the image sensor 5R and an imaging surface 8R of the image sensor 6R in the right-eye optical path are also arranged as in the left-eye optical path. It is desirable, from the point of easiness of a view, that the focus positions of the object surfaces relative to the image sensors 5L and 5R are made to nearly coincide with those of the object surfaces relative to the image sensors 6L and 6R. However, the focus positions may be different, depending on purposes, and there is no problem of practical use in most cases.

The images formed on the left and right imaging surfaces 7L, 7R, 8L, and 8R are processed through image processors 11L, 11R, 12L, and 12R, respectively, and are displayed on corresponding image display devices 13L, 13R, 14L, and 14R in the observing section. In the left-eye optical path of the observing section, images displayed on the image display devices 13L and 14L are compounded by a photosynthetic element 15L and this composite image is magnified by an eyepiece 16L so that the viewer is capable of observing the image with a left eye 17L. The images displayed on the image display devices 13L and 14L are such that the image of the object surface located closer to the imaging section is displayed on the image display device located at the position where a distance, measured along the optical axis, from the viewer is shorter, while the image of the object surface located farther away from the imaging section is displayed on the image display device located at the position where a distance, measured along the optical axis, from the viewer is longer. For example, the subject surface 9 is located farther away from the imaging section than the object surface 10, and thus the display surface of the image display device 13L displaying the image of the object surface 9 is located at the position where a distance, measured along the optical axis, from the position of observation of the viewer is longer than in the display surface of the image display device 14L.

Likewise, in the right-eye optical path, images displayed on the image display devices 13R and 14R are compounded by a photosynthetic element 15R and this composite image is magnified by an eyepiece 16R so that the viewer is capable of observing the image with a right eye 17R. The images displayed on the image display devices 13R and 14R, as in the left-eye optical path, are such that the image of the object surface located closer to the imaging section is displayed on the image display device located at the position where a distance, measured along the optical axis, from the viewer is shorter, while the image of the object surface located farther away from the imaging section is displayed on the image display device located at the position where a distance, measured along the optical axis, from the viewer is longer.

The image display devices are located at positions where a difference between distances, measured along the optical axes, from adjacent image display devices 13L and 14L; or 13R and 14R to the eyepiece 16L or 16R in the left or right optical path are larger than the depth of the viewer's eye. In such an arrangement, the information of a change of contrast in the direction of the optical axis is emphasized and a better stereoscopic image is obtained.

Figure 2:
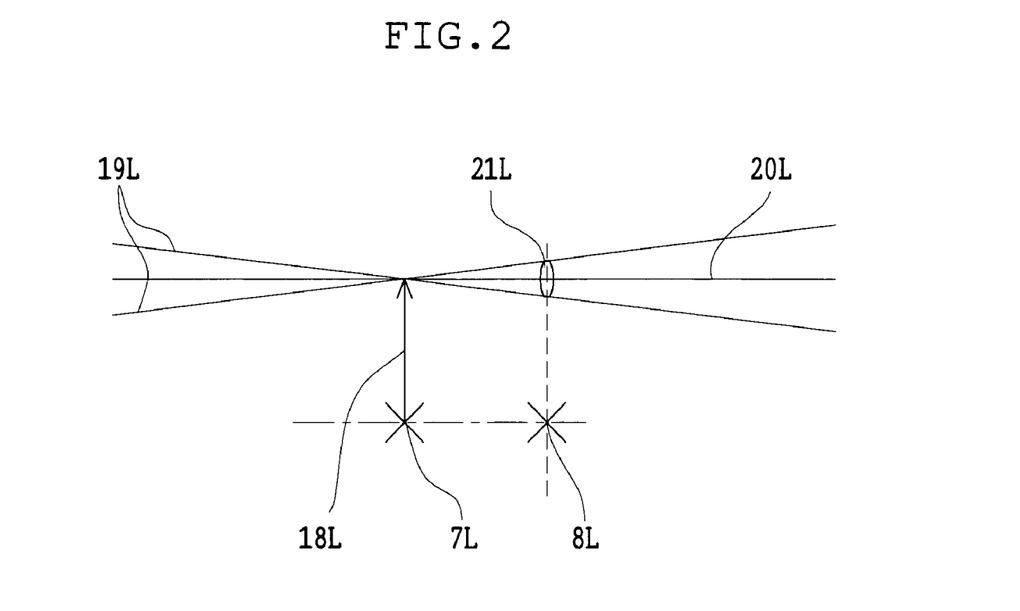
FIG. 2 is an explanatory view showing a relative positional relationship between imaging surfaces.

Besides general adjustments of white balance, sharpness, and contrast, each of the image processors 11L, 11R, 12L, and 12R uses a device that color and brightness adjustments and a magnification adjustment for superimposing the images are made so that there is no difference in color, brightness, and size between images to be superimposed. The magnification adjustment for superimposing the images is explained with reference to FIGS. 2–4. Also, a description is given of only the left-eye optical path, and the description of the right-eye optical path, which is the same as in the left-eye optical path, is omitted. FIG. 2 shows the relative positional relationship between the imaging surfaces 7L and 8L. For convenience of explanation, the conjugate position of the imaging surface 7L is shown on the optical path of the transmission side of the light-splitting element 4L. In FIG. 2, an image where an arrow at the position of the object surface 9 of FIG. 1 is imaged on the imaging surface 7L is denoted by 18L. A light beam passing through the top of the arrow of the image 18L is denoted by 19L and a chief ray of the light beam is denoted by 20L. A cross region that the light beam 19L crosses the imaging surface 8L is denoted by 21L.

Figure 3:
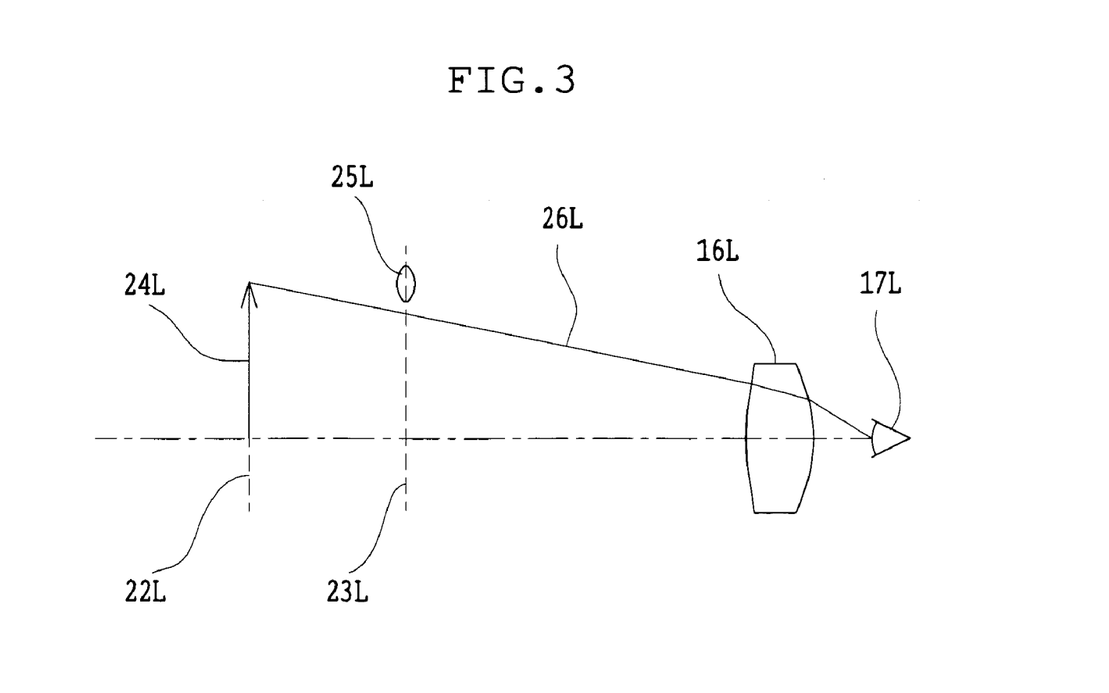
FIG. 3 is an explanatory view showing the display position of the image of an arrow formed on the imaging surface of FIG. 2.

FIG. 3 shows the display position of the image 18L of the arrow formed on the imaging surface 7L of FIG. 2. In FIG. 3 also, as in FIG. 2, the relative positional relationship between the display devices 13L and 14L is shown. The image formed on the imaging surface 7L of FIG. 2, as shown in FIG. 3, is displayed as an image 24L on a display surface 22L of the display device 13L, while the image formed on the imaging surface 8L is displayed on a display surface 23L of the display device 14L. Also, the image of the cross region 21L formed on the imaging surface 8L by passage of the light beam through the top of the arrow is displayed in a cross region 25L on the display surface 23L of the display device 14L. In FIG. 3, a chief ray observed by the viewer through the eyepiece 16L is denoted by 26L.

Figure 4:
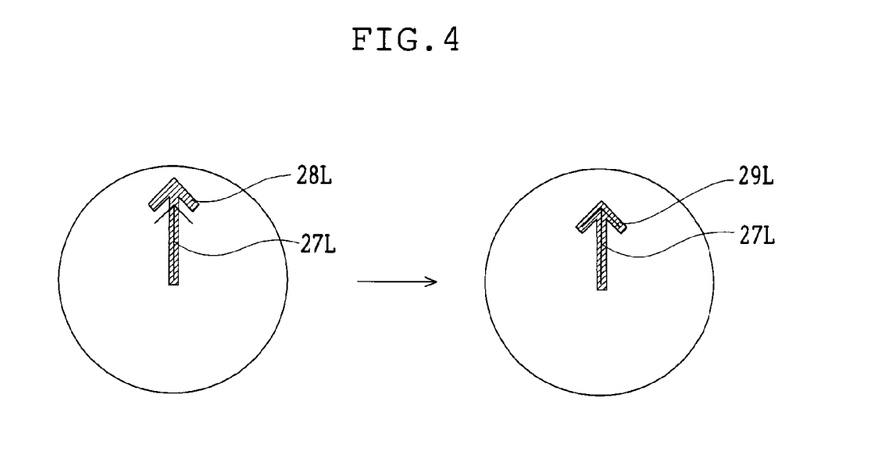
FIG. 4 is an explanatory view showing an observation image in a state where images are superimposed.

In this case, images to be observed by the viewer, as illustrated on the left hand of FIG. 4, are such that a blurred image 28L of the arrow displayed on the display surface 23L and an image 27L of the arrow displayed on the display surface 22L are not superimposed. When these images are superimposed, the change of contrast of the image caused by the shift of the focus position can be recognized and stereoscopic information is acquired. The image processors 11L and 12L are thus constructed so that the images are processed to change from the left-hand condition of FIG. 4 to the right-hand condition and are superimposed in the observing section. In FIG. 4, digital zoom is used for the blurred image 28L of the arrow through the image processor 12L and thereby the blurred image 28L of the arrow is changed to an image 29L in which the magnification is altered, so that the image 29L is superimposed on the image 27L of the arrow in the observing section.

Figure 5:
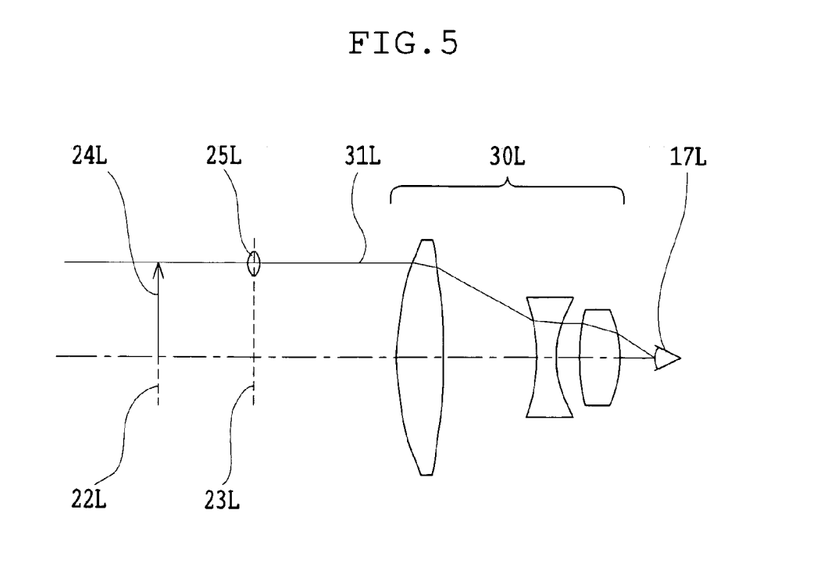
FIG. 5 is an explanatory view showing an example where an eyepiece constructed with a plurality of lens elements so that an entrance pupil can be adjusted, instead of each of eyepieces of FIG. 1, is used to superimpose images.

FIG. 5 shows an example where an eyepiece 30L constructed with a plurality of lens elements so that the entrance pupil can be adjusted, instead of the eyepiece 16L of FIG. 1, is used to superimpose images. Also, although in FIG. 5 only the left-eye optical path is described, the same holds for the right-eye optical path. In FIG. 5, a chief ray 31L governed by the eyepiece 30L and observed by the viewer passes through the cross region 25L and travels through the top of the displayed image 24L of the arrow. By doing so, the adjustment of electronic zoom described in FIG. 4 becomes unnecessary. However, when the pupil of the observing section is considerably shifted, it is difficult that the pupil of the eyepiece 30L is shifted in accordance with the zoom of the imaging section. The shift of the pupil of the observing section is largely due to the afocal zoom lenses 2L and 2R and becomes pronounced when an aperture stop is located inside, or on the object side of, each of the afocal zoom lenses 2L and 2R. Thus, in the arrangement of FIG. 5, it is good practice to place the aperture stop on the image side of each of the afocal zoom lenses 2L and 2R.

According to the binocular stereoscopic observation apparatus of the first embodiment constructed as mentioned above, information in the direction of the line of sight of the stereo image can be added and more accurate stereoscopic information can be provided to the viewer. Whereby, fatigue due to observation can be lessened. When the optical system is designed so that a plurality of imaging surfaces arranged at different distances on the optical axis can be moved along the optical axis, images at two places that are good in resolution can be stereoscopically viewed at the same time. This is effective when something with which the problem is caused by contact is present ahead of a desired part to be observed. It is, for example, the case where a blood vessel with which the problem is caused by contact of an operation tool is present ahead of a part to be operated in the observation of a surgical operation under the microscope and its position deviates considerably from the depth of the optical system of the microscope. Since formerly the operation has been performed while making sure that there is no problem of contact by carrying out again focusing, much time has been required and a heavy load has been imposed on an operator. However, when the part to be operated and the blood vessel lying outside the depth are focused simultaneously, this serves to reduce the operation time and to lessen the fatigue of the operator.

Also, although the imaging section of the first embodiment is of the type that it is provided to a single-objective stereomicroscope, the imaging section may, of course, be provided to a Greenough stereomicroscope. In this case, as the light-splitting elements 4L and 4R and the photosynthetic elements 15L and 15R, half mirrors, beam splitters, and mirrors partially constructed with mirrors, each having a high-speed rotating mechanism, are applicable. When the image sensors 7L and 7R and the display devices 13L and 13R are arranged perpendicular to the plane of the page, the light-splitting elements 4L and 4R and the photosynthetic elements 15L and 15R, each pair of which is integrally constructed, can be common to the left and right optical paths. By doing so, a difference between properties due to variations of fabrication of the light-splitting elements 4L and 4R and the photosynthetic elements 15L and 15R is not produced. The image sensors 5L, 5R, 6L, and 6R are constructed as CCDs, CMOSs, or pickup tubes. In the present invention, a device increasing the sensitivity, such as an image intensifier, falls into the category of the image sensor. The display devices 13L, 13R, 14L, and 14R are constructed as liquid crystal display devices, reflection-type liquid crystal display devices, or CRT monitors.

Second Embodiment

Figure 6:
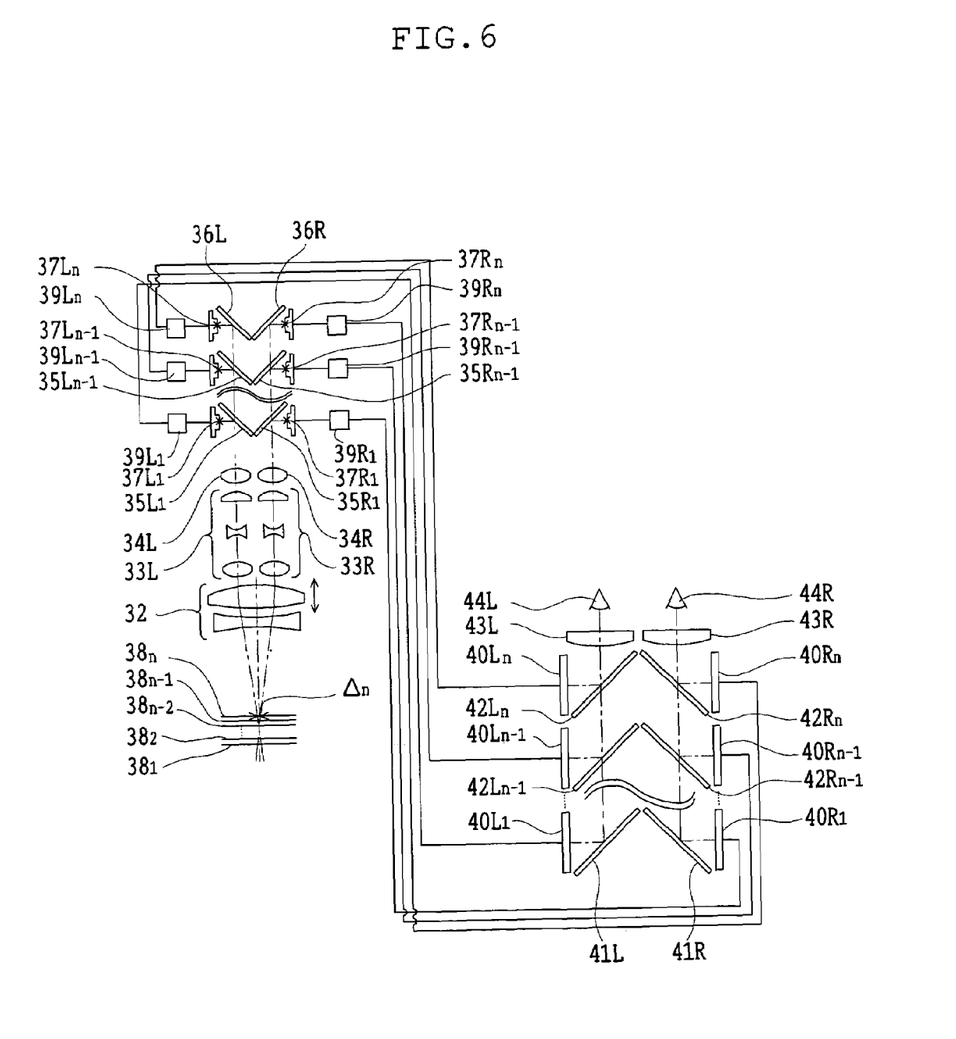
FIG. 6 is a view showing schematically the structure of the binocular stereo-scopic observation apparatus of a second embodiment in the present invention.

FIG. 6 shows the binocular stereoscopic observation apparatus of the second embodiment in the present invention.

The binocular stereoscopic observation apparatus of the second embodiment includes an imaging section forming images of an object to be observed and an observing section in which formed images are observed by a viewer. The imaging section of the second embodiment has n image sensors on each of the left and right optical paths.

Specifically, the imaging section has a variable-WD objective unit 32; a pair of left and right imaging optical systems that includes a pair of left and right afocal zoom lenses 33L and 33R and a pair of left and right imaging lenses 34L and 34R; light-splitting elements $35L_1$–$35L_{n-1}$ and $35R_1$–$35R_{n-1}$; mirrors 36L and 36R; and image sensors $37L_1$–$37L_n$ and $37R_1$–$37R_n$. In this figure, symbol L attached to each reference numeral indicates the left-eye optical path and R indicates the right-eye optical path. The subscript of each reference numeral indicates the number among n or (n−1) members.

The variable-WD objective unit 32 is constructed so that a part of its lens system is moved and image positions from which afocal light beams emerge can be shifted. The afocal zoom lenses 33L and 33R are such as to vary the magnification and to change a light beam leaving the variable-WD objective unit 32 to the afocal light beams. The imaging lenses 34L and 34R are such as to image the afocal light beams emerging from the afocal zoom lenses 33L and 33R at preset imaging positions.

The light-splitting elements $35L_1$–$35L_{n-1}$ and $35R_1$–$35R_{n-1}$ and the mirrors 36L and 36R are arranged on the exit side of the left and right imaging optical systems so that emergent light beams from the imaging optical systems are introduced into the left and right image sensors $37L_1$–$37L_n$ and $37R_1$–$37R_n$, n for each of the two optical path, and can be imaged. An object surface from which the afocal light beam emerges through the variable-WD objective unit 32 is situated between object surfaces $38_1$–$38_n$ corresponding to the image sensors $37L_1$–$37L_n$ or $37R_1$–$37R_n$. Also, although in FIG. 6 each of the object surfaces is shown to be the same surface with respect to the left and right optical paths, the object surface may not necessarily coincide with the left and right optical paths. The imaging positions of the image sensors are provided by making the difference between distances, measured along the optical axis, from adjacent imaging surfaces to each of the imaging lenses so that the difference between distances, measured along the optical axis, from each of the imaging lenses 34L and 34R to the image sensors, as in the imaging section of the first embodiment, is larger than the image-side depth of the optical system of the imaging section.

The observing section of the second embodiment has image processors $39L_1$–$39L_n$ and $39R_1$–$39R_n$, image display devices $40L_1$–$40L_n$ and $40R_1$–$40R_n$, mirrors 41L and 41R, photosynthetic elements $42L_2$–$42L_n$ and $42R_2$–$42R_n$, and eyepieces 43L and 43R.

The images formed on the left and right image sensors $37L_1$–$37L_n$ and $37R_1$–$37R_n$ are processed by the corresponding image processors $39L_1$–$39L_n$ and $39R_1$–$39R_n$ and are displayed on the corresponding image display devices $40L_1$–$40L_n$ and $40R_1$–$40R_n$. mirrors 41L and 41R and the photosynthetic elements $42L_2$–$42L_n$ and $42R_2$–$42R_n$. The composite image is magnified by the eyepieces 43L and 43R so that it can be observed with eyes 44L and 44R of the viewer. The display positions of the image display devices $40L_1$–$40L_n$ and $40R_1$–$40R_n$ are assumed so that the relative positions in the directions of lines of sight are not known with respect to the imaging positions of the image sensors $37L_1$–$37L_n$ and $37R_1$–$37R_n$. In this state, the magnification is adjusted by the image processors $39L_1$–$39L_n$ and $39R_1$–$39R_n$ so that all images to be observed by the viewer on each side are superimposed.

Also, in the imaging section, even though the centers of the images (the optical axes of the image sensors) are in misaligned relation, this misalignment can be adjusted by the image processors $39L_1$–$39L_n$ and $39R_1$–$39R_n$, but in this case, the visual field becomes narrow. It is thus desirable to align the centers of the images (the optical axes of the image sensors) of at least one optical path of the imaging section. When an arrangement is made such that the difference between distances, measured along the optical axis, from the imaging lens 34L or 34R to the imaging positions of the image sensors $37L_1$–$37L_n$ or $37R_1$–$37R_n$ in the imaging section and the difference between distances, measured along the optical axis, from the eyepiece 43L or 43R to the display positions of the image display devices $40L_1$–$40L_n$ and $40R_1$–$40R_n$ in the observing section are proportional to the enlargement ratio (display size/imaging size), images similar to optical images are obtained. In the observing section also, when the difference between distances, measured along the optical axis, from adjacent display positions to each eyepiece, as in the observing section of the first embodiment, is larger than the depth of the observer's eye, the image appears stereoscopically even when observed with one eye.

Figure 7:
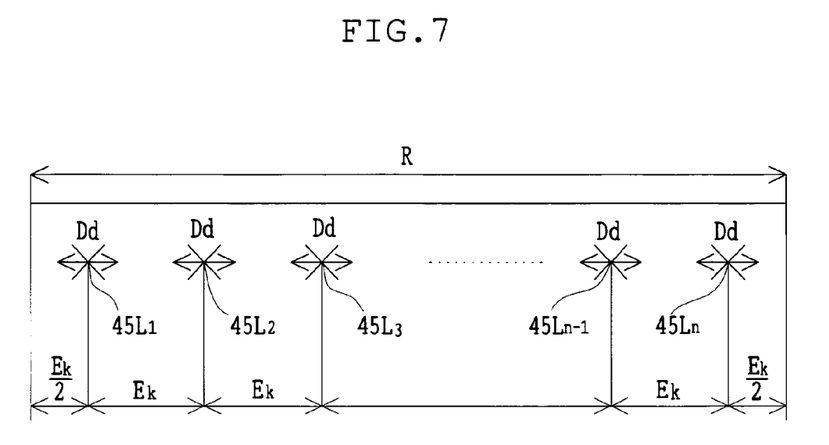
FIG. 7 is a view showing a positional relationship between image sensors arranged in a necessary focus range and a relationship between the focal depth of the optical system of the imaging section and the spacing between the image sensors.
Figure 8:
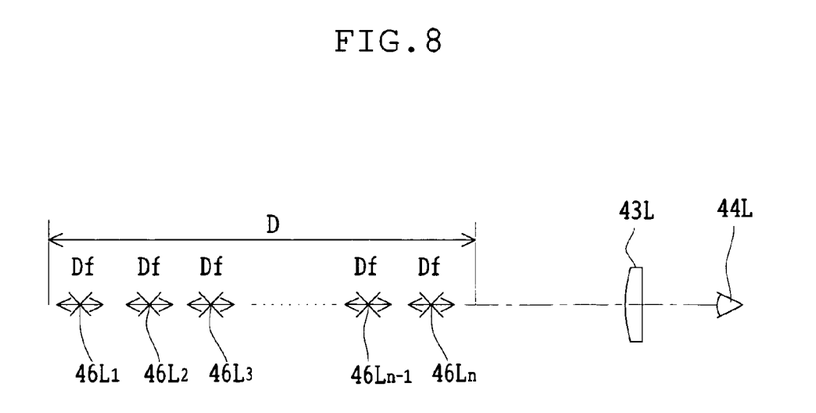
FIG. 8 is a view showing an example of an arrangement of display devices within a region in which focusing is performed by the accommodation of a viewer with respect to an observation wavelength in the observing section.

According to the above technique, the image can be made similar to the optical image and some cumbersome points of the optical microscope can also be improved. One of them is that since the depth of field of the optical system of a conventional imaging section is small, it is difficult to focus a desired position to be observed. Techniques for improving this point are shown in FIGS. 7 and 8. In FIG. 7, a description is given of only the left-eye optical path, but the same holds for the right-eye optical path. As shown in FIG. 7, it is desirable that n imaging surfaces $45L_1$–$45L_n$ are equally spaced in a necessary focus range R and the image sensors are arranged on the imaging surfaces to form the images. The distance Ek between the image sensors should preferably be Ek=R/n. The image-side depth Dd of the optical system of the imaging section is R/n≧Dd.

When the images formed on the image sensors are displayed in each of the left and right optical paths of the observing section, the difference between distances, measured along the optical axis, from adjacent display devices to each eyepiece of the observing section is represented by Fk and the depth of the viewer's eye is represented by $D_{eye}$ so that the condition of $D_{eye}$<Fk is imposed. In this case, the information of a change of contrast in the direction of the optical axis is not completely secured, and an image approaching to a composite image in which identical images are superimposed is obtained and cannot be stereoscopically observed. Consequently, the observing section is designed to satisfy the condition of $D_{eye}$<Fk and thereby a superimposed display image can be stereoscopically observed.

When the imaging section and the observing section are constructed as mentioned above, the image of the object lying within the range on the object side conjugate with the necessary focus range R can be stereoscopically observed with good resolution, and thus the above problem can be solved.

FIG. 8 shows an example of an arrangement of display devices $46L_1$–$46L_n$ within a range D in which focusing is performed by the accommodation of the viewer's eye with respect to an observation wavelength λ in the observing section. When a focal length foc of each of the eyepieces 43L and 43R, the pupil diameter Ep of the viewer, and the observation wavelength λ are used, a depth Df of the optical system of the observing section is expressed by $$Df=2\times foc^2/Ep\times(\lambda/Ep+1/1750)$$

Here, a wavelength to which the eyes are most sensitive is substituted for the wavelength λ. In general, when filters limiting wavelengths are not included, the wavelength λ is 550 nm.

This equation is the modification of Berek's equation. In the observing section, when the diopter s (1/m) is assumed to be present, the range D in which focusing is performed by the accommodation of the eye with respect to the observation wavelength λ is given as $$D=s\times foc^2/1000$$

From the above equations, the number of images to be formed, denoted by n, is given as $$2\leq n\leq D/Df=s\times Ep/2000/(\lambda/Ep+1/1750)$$

From this, the difference Ek between distances, measured along the optical axis, from adjacent imaging positions to each imaging lens in the imaging section is kept within the following limit:

$$R\times 2000\times(\lambda/Ep+1/1750)/(s\times Ep)\leq Ek\leq R/2$$

In the above limit, there is the possibility that a blurred portion is produced. In this case, since the purpose is to make observations in a wide range and resolution may be deteriorated to some degree, the aperture is stopped down and the depth is increased. When the number of images to be formed in the imaging section is denoted by n, the resolution limit of the optical system of the imaging section is denoted by P, a necessary depth width is denoted by s, and the exit numerical aperture is denoted by NA', s=R/n and hence it is favorable to satisfy the following condition:

$$NA'\leq n\ P/R$$

In the above description, only the left-eye optical path is shown, but the same holds for the right-eye optical path.

The imaging section and the observing section are constructed to satisfy the above conditions, and thereby when observation is carried out by a general viewer, an image lying in a sufficiently wide observation range can be observed as a stereoscopic image.

Figure 9:
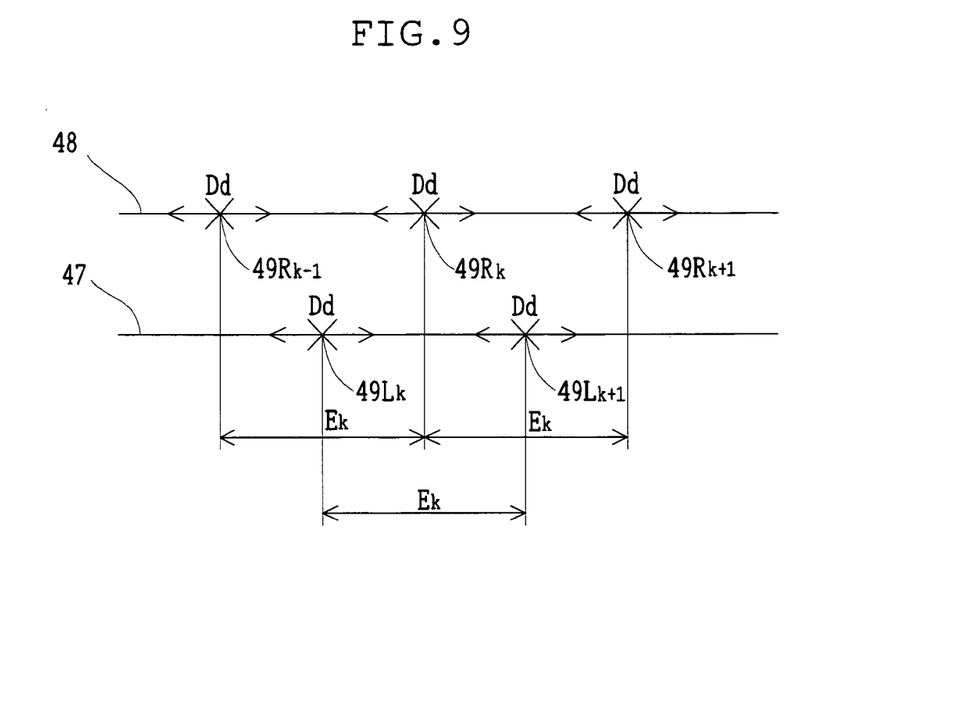
FIG. 9 is a view showing positional relationship between image sensors arranged on the left and right optical paths of the imaging section and the focal depth of the optical system of the imaging section.

Subsequently, reference is made to a technique for increasing a region that is good in resolution. A person, when observing images with his eyes, has the nature of viewing an image of better resolution in preference to the other. By utilizing this, the deterioration of resolution of a blurred image deviating slightly from the depth, viewed with one eye, can be compensated by viewing a resolved image with the other. In this case, the positional relationship between the image sensors arranged on the left and right optical paths of the imaging section and the focal depth of the optical system of the imaging section is as shown in FIG. 9. In this figure, to explain the relationship between the imaging positions of the left and right optical paths, a left-eye optical path 47 and a right-eye optical path 48; and left-eye optical path imaging positions $49L_k$ and $49L_{k+1}$ and right-eye optical path imaging positions $49R_{k-1}$, $49R_k$, and $49R_{k+1}$ are shown.

In FIG. 9, the left and right imaging positions are shifted, the image sensors are arranged at the imaging positions, and the display devices are also arranged accordingly in the observing section so that the difference between distances, measured along the optical axis, from adjacent imaging positions of each of the left and right optical paths in the imaging section to each imaging lens in the imaging section is set to be Ek=constant and the difference between a distance from the imaging lens to the kth imaging position of the right-eye optical path and a distance from the imaging lens to the kth imaging position of the left-eye optical path becomes Ek/2. When the image-side depth of the optical system of the imaging section is represented by Dd, the optical system is designed to satisfy the condition, Ek≦2Dd. By doing so, images formed, for example, in regard to the kth image sensor of the right-eye optical path and the kth and (k+1)th image sensors of the left-eye optical path which are located before and behind it are placed in respective focal depths and resolved. Therefore, the stereoscopic observation can be carried out as if the depth of field were enlarged to space between the object surfaces conjugate with the kth and (k+1)th imaging positions of the left-eye optical path, irrespective of viewing the object surface conjugate with the kth imaging position of the right-eye optical path. When focusing is performed for still image photography by this apparatus, it is desirable that the apparatus is designed to change the focus position of one optical path so that the left and right focus positions become identical. Specifically, the image sensors arranged on the left and right optical paths can be moved along the optical axes by at least ±Ek/2, and in still image photography, the kth image sensors on the left and right optical paths are moved so that a pair of left and right images of the same object surface are photographed. Of images captured by respective image sensors, only images formed at imaging positions where a distance Δk between the left and right optical axes on the object surface conjugate with the kth imaging positions is minimized are displayed on the kth display devices of the observing section.

Figure 10:
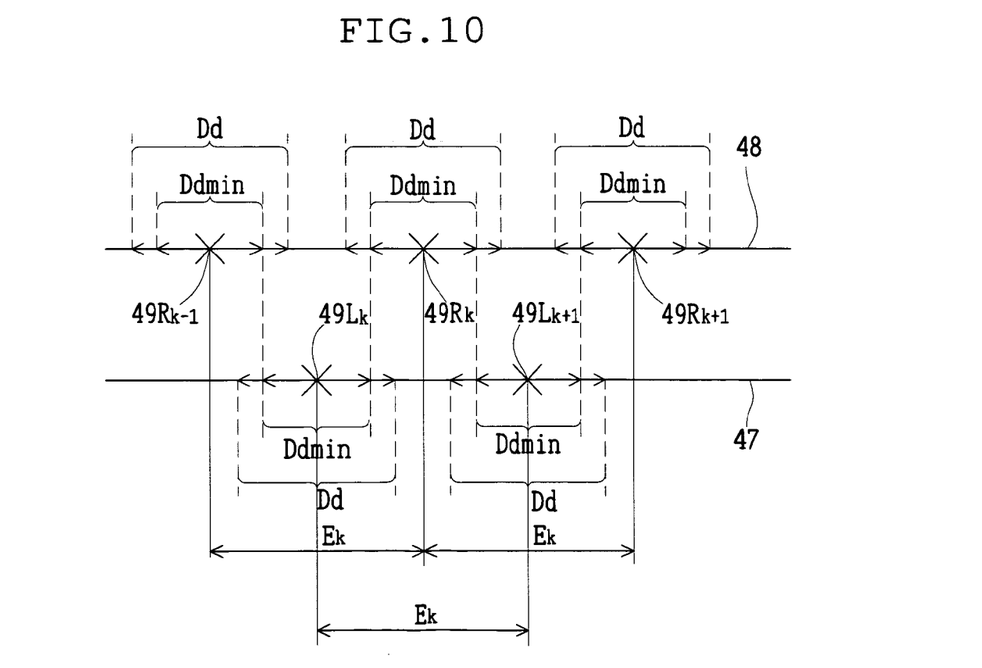
FIG. 10 is a view showing image sensors arranged so that a difference between distances, measured along the optical axis, from adjacent image sensors to the imaging lens in the imaging section is $2Dd_{min}$.

The image-side depth Dd of the optical system of the imaging section is often changed by zooming. It is, therefore, most desirable that the difference Ek between the distances, measured along the optical axis, from adjacent image sensors to each imaging lens is changed in association with zooming. Whereby, however, the apparatus is complicated and the problem of oversizing is produced. Thus, when the image-side depth of the optical system of the imaging section that is minimized in accordance with zooming is denoted by $Dd_{min}$, it is good practice to arrange the image sensors so that $Ek=2Dd_{min}$. This is shown in FIG. 10. In this figure, the image sensors are arranged on the left and right optical paths so as to satisfy the equation, $Ek=2Dd_{min}$.

By doing so, proper distances between the image sensors can be always maintained, irrespective of zooming, and hence a stereoscopic, natural image can be obtained in any zoom state. At the same time, an excellent effect that the apparatus is neither complicated nor oversized can be brought about.

When a display technique of capturing an image of moderate resolution in a wide range can be switched to that of displaying an image of good resolution in a narrow range, the operation of the viewer is facilitated. When there is a constant low between the zoom magnification and these two display techniques, the apparatus may be constructed so that the law is stored and the display state is altered by only the change of zoom.

It is sometimes desired that a still image photographing device is mounted to this apparatus to photograph an object. In such a case, if the focus of the still image photographing device can be recognized by the optical system of the observing section, work efficiency will be improved. In the optical system of the observing section of the second embodiment, however, the image similar to the optical image is formed and thus a focusing range is wide. In order to improve the accuracy of focusing of the still image formation, it is favorable that only photographing images formed close to the intersection of the left and right optical axes of the optical system of the imaging section are displayed through the optical system of the observing section (more specifically, only images formed at imaging positions where a distance Δj between the left and right optical axes on the object surface conjugate with the jth imaging positions is minimized are displayed on the jth display devices of the observing section), and these are used to perform focusing. In doing so, since there is no display of other images and thus the observation images become dark, but when the display devices displaying the images are made bright, the apparatus is easily used.

Figure 11:
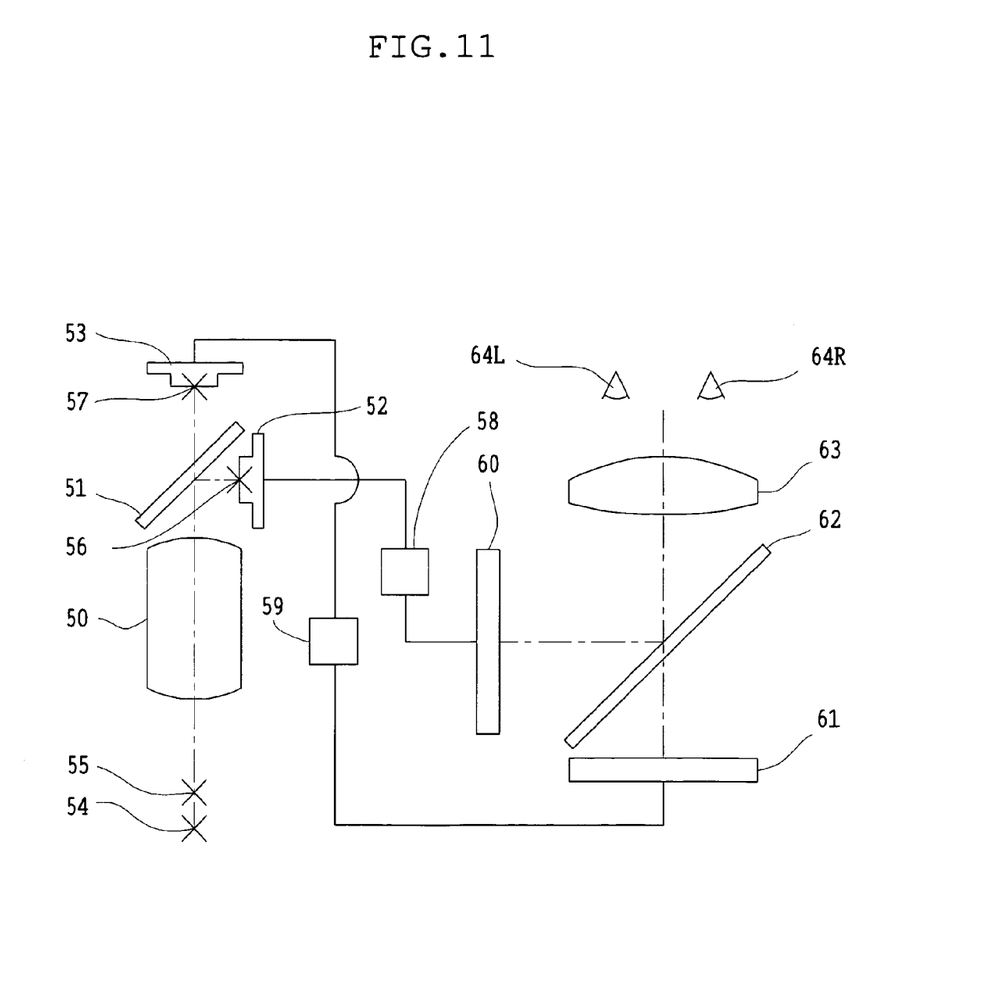
FIG. 11 is a view showing schematically the structure of the binocular stereo-scopic observation apparatus of a third embodiment in the present invention.

FIG. 11 shows the binocular stereoscopic observation apparatus of the third embodiment in the present invention. The binocular stereoscopic observation apparatus of the third embodiment is constructed so that, by utilizing the fact that the display positions of the images can be changed, an absolute value α of the longitudinal magnification and an absolute value β of the lateral magnification are corrected to become equal. As the lens characteristic, there is the following relation:

$$\alpha = \beta^2$$

Because of this characteristic, the convexity or concavity of the lens is emphasized in a high magnification and an image different from an actual one is produced. In particular, when the image is combined with images with parallax, the positions of the images in the directions of the optical axes are different and an unnatural image is produced. When the images are displayed at display positions of α=|β|, a natural, magnified stereoscopic image is obtained.

For convenience of illustration, the third embodiment shows two-image formation with a single-eye optical path. The imaging section includes an imaging lens system 50 provided with zoom and focus functions, light-splitting element 51, and image sensors 52 and 53. Observation object points 54 and 55 are imaged on an imaging surface 56 of the image sensor 52 and an imaging surface 57 of the image sensor 53, respectively.

Figure 12:
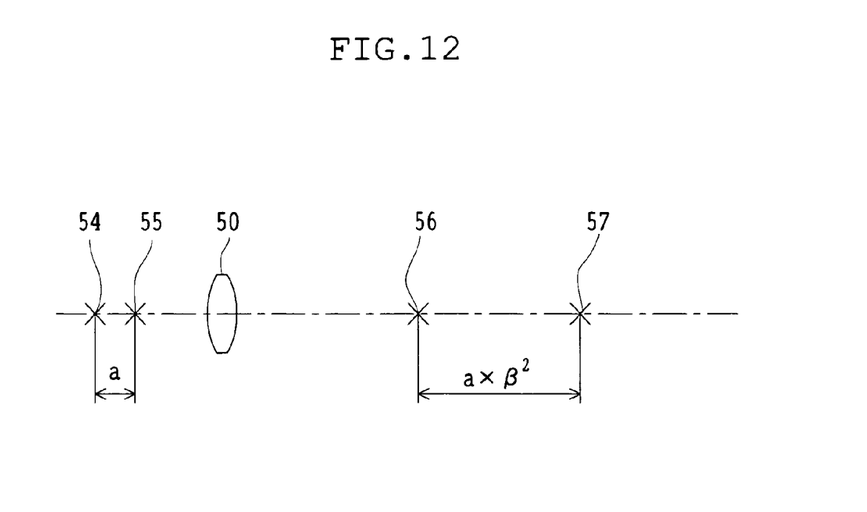
FIG. 12 is an explanatory view showing a relative positional relationship on the optical axis between imaging positions in the imaging section.
Figure 13:
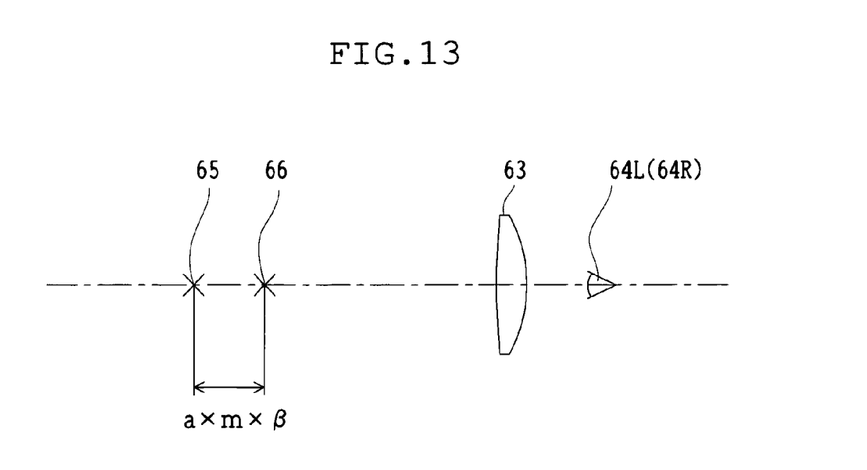
FIG. 13 is an explanatory view showing a relative positional relationship on the optical axis between display positions in the observing section.

Images captured by the image sensors 52 and 53 are processed by image processor 58 and 59, respectively. The images processed by the image processors 58 and 59 are displayed on image display devices 60 and 61, respectively. These displayed images are compounded by a photosynthetic element 62 so that they are observed with the viewer's eyes 64L and 64R through an eyepiece 63. The display devices 60 and 61 are arranged so that the images to be observed are formed in accordance with the distances of the observation object points 54 and 54 imaged by the imaging section. The relative positional relationship on the optical axis between the imaging positions in the imaging section is shown in FIG. 12, and the relative positional relationship on the optical axis between the display positions in the observing section is shown in FIG. 13. When a distance, measured along the optical axis, between the observation object points 54 and 55 is represented by a and the lateral magnification is represented by β, the difference of the distance, measured along the optical axis, between the imaging surfaces 56 and 57 that are image planes is $a \times \beta^2$. The magnification where each image is displayed in the observing section is denoted by m, and the display positions of the images corresponding to the observation object points 54 and 55 to be observed by the viewer are denoted by 65 and 66, respectively. The display positions 65 and 66 are provided so that a distance between them is $a \times m \times \beta$. This is equal to the case where the distance between the display positions is multiplied by 1/β along the line of sight and brings about a state where the longitudinal magnification α and the lateral magnification β are α=β. In this state, image magnifications are adjusted so that formed images viewed from the observation positions are superimposed through the image processors 58 and 59.

In the third embodiment, the optical system with a single-eye optical path is shown, but when the apparatus, as shown in the first and second embodiments, is constructed with a binocular optical system in which a pair of optical systems are arranged opposite to each other, a more favorable stereoscopic image can be observed.

According to the present invention, electronic image stereomicroscope producing the stereoscopic image in which a focus range of an image observed by the viewer is wide and fatigue is lessened can be provided. In particular, the range of good resolution is widened in the direction of the depth so that detailed information is acquired for the viewer and a natural image is obtained by correction for the longitudinal magnification.

What is claimed is:

1. A binocular stereoscopic observation apparatus comprising:
   an imaging section forming left and right images with parallax in at least two directions; and
   an observing section in which the images with parallax are stereoscopically observed with a viewer's eyes,
   wherein the imaging section has an imaging lens forming images of an object at imaging positions on each of left and right optical paths and i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section,
   the observing section has an eyepiece optical system and i display devices on each of the left and right optical paths so that an image formed at the jth imaging position from the imaging lens on each optical path of the imaging section is displayed on a jth display device from the eyepiece optical system on a corresponding optical path, satisfying the following condition:

$$M_j < M_{(j-1)}$$

where $M_j$ is a distance, measured along the optical axis, from the eyepiece optical system to the jth display device, and
   the observing section further has means for superimposing i displayed images on a viewer's pupil, and here, i is an integer of 2 or more and j is an integer satisfying conditions, $1 \leq j \leq i$ and $j \geq 2$.

2. A binocular stereoscopic observation apparatus according to claim 1, wherein the observing section further satisfies the following conditions:

$$Fk = M_{(j-1)} - M_j$$

$$D_{eye} < Fk$$

where Fk is a difference between distances, measured along the optical axis, from adjacent display devices to the eyepiece on each of the optical paths and $D_{eye}$ is a depth of a viewer's eye.

3. A binocular stereoscopic observation apparatus according to claim 1, wherein the means for superimposing the images is electronic zoom processing means.

4. A binocular stereoscopic observation apparatus according to claim 1, wherein the i displayed images are superimposed on an entrance pupil of an optical system of the observing section.

5. A binocular stereoscopic observation apparatus according to claim 1, further comprising means for shifting jth imaging positions in association with zooming on the left and right optical paths.

6. An electronic image stereomicroscope comprising:
   an imaging section forming left and right images with parallax in at least two directions; and
   an observing section in which the images with parallax are stereoscopically observed with a viewer's eyes,
   wherein the imaging section has an imaging lens forming images of an object at imaging positions on each of left and right optical paths and i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section,
   the observing section has an eyepiece optical system and i display devices on each of the left and right optical paths so that an image formed at the jth imaging position from the imaging lens on each optical path of the imaging section is displayed on a jth display device from the eyepiece optical system on a corresponding optical path, satisfying the following condition:

$$M_j < M_{(j-1)}$$

where $M_j$ is a distance, measured along the optical axis, from the eyepiece optical system to the jth display device, and
   the observing section further has means for superimposing i displayed images on a viewer's pupil, satisfying the following equation:

$$|L1L - L1R| = Ek/2$$

where L1L is a distance, measured along the optical axis, from the imaging lens on a left optical path to an imaging position closest thereto and L1R is a distance, measured along the optical axis, from the imaging lens on a right optical path to an imaging position closest thereto, and here, i is an integer of 2 or more, j is an integer satisfying conditions, $1 \leq j \leq i$ and $j \geq 2$, and $k = j-1$.

7. An electronic image stereomicroscope according to claim 6, further satisfying the following condition:

$$Ek \leq 2Dd.$$

8. An electronic image stereomicroscope according to claim 6, wherein any imaging position on one of the left and right optical paths of the imaging section is shifted by Ek/2, and only images formed at imaging positions where a distance $\Delta j$ between left and right optical axes on an object surface conjugate with jth imaging positions is minimized are displayed on jth display devices of the observing section.

9. An electronic image stereomicroscope comprising:
   an imaging section forming a plurality of images of an object to be observed; and
   an observing section displaying the images,
   wherein the imaging section is provided with an imaging lens forming the images of the object at imaging positions and has i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section, the observing section has an eyepiece optical system and i display devices so that an image formed at the jth imaging position from the imaging lens of the imaging section is displayed on a jth display device from the eyepiece optical system, satisfying the following condition:

$$M_j < M_{(j-1)}$$

where $M_j$ is a distance, measured along the optical axis, from the eyepiece optical system to the jth display device, the observing section further has means for superimposing i displayed images on the viewer's pupil, and a difference between distances, measured along the optical axis, from adjacent display devices to the eyepiece optical system, $Fk = M_{(j-1)} - M_j$, is set so that absolute values of a longitudinal magnification and a lateral magnification of the optical system of the imaging section become equal, where i is an integer of 2 or more, j is an integer satisfying conditions, $1 \leq j \leq i$ and $j \geq 2$, and $k = j - 1$.

10. An electronic image stereomicroscope comprising:

an imaging section forming left and right images with parallax in at least two directions; and an observing section in which the images with parallax are stereoscopically observed with a viewer's eyes, wherein the imaging section has an imaging lens forming images of an object at imaging positions on each of left and right optical paths and i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section, the observing section has an eyepiece optical system and i display devices on each of the left and right optical paths and displays an image formed at the jth imaging position from the imaging lens on each optical path of the imaging section, on a jth display device from the eyepiece optical system on a corresponding optical path, satisfying the following condition:

$$M_j < M_{(j-1)}$$

where $M_j$ is a distance, measured along the optical axis, from the eyepiece optical system to the jth display device, the observing section further has means for superimposing i displayed images on a viewer's pupil, and a difference Ek between distances, measured along the optical axis, from adjacent imaging positions to the imaging lens satisfies the following condition:

$$R \times 2000 \times (\lambda/Ep + 1/1750)/(s \times Ep) \leq Ek \leq R/2$$

where Ep is a diameter of the viewer's pupil, s (1/m) is a diopter that the viewer is capable of performing focusing, $\lambda$ is an observation wavelength of the viewer, and R is a necessary imaging region on an image side in the imaging section, and here, i is an integer of 2 or more, j is an integer satisfying conditions, $1 \leq j \leq i$ and $j \geq 2$, and $k = j - 1$.

11. An electronic image stereomicroscope according to claim 10, further satisfying the following condition:

$$NA' \leq n\,P/R$$

where n is the number of images to be formed in the imaging section, P is a resolution limit of the optical system of the imaging section, and NA' is a numerical aperture of emergence.

12. An electronic image stereoscopic observation apparatus comprising:

an imaging section forming left and right images with parallax in at least two directions; and an observing section in which the images with parallax are stereoscopically observed with a viewer's eyes, wherein the imaging section has an imaging lens forming images of an object at imaging positions on each of left and right optical paths and i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section, the observing section has an eyepiece optical system and i display devices on each of the left and right optical paths and displays an image formed at the jth imaging position from the imaging lens on each optical path of the imaging section, on a jth display device from the eyepiece optical system on a corresponding optical path, satisfying the following condition:

$$M_j < M_{(j-1)}$$

where $M_j$ is a distance, measured along the optical axis, from the eyepiece optical system to the jth display device, and the observing section further has means for superimposing i displayed images on a viewer's pupil, and a difference between distances, measured along the optical axis, from adjacent display devices to the eyepiece optical system, $Fk = M_{(j-1)} - M_j$, is set so that absolute values of a longitudinal magnification and a lateral magnification of the optical system of the imaging section become equal, where i is an integer of 2 or more, j is an integer satisfying conditions, $1 \leq j \leq i$ and $j \geq 2$, and $k = j - 1$.

13. An electronic image observation apparatus comprising:
- an imaging section forming a plurality of images of an object to be observed; and
- an observing section displaying the images,
- wherein the imaging section has an imaging lens forming the images of the object at imaging positions, a zoom optical system, and i imaging positions on an optical axis of the imaging lens, satisfying the following conditions:

$$L_{(j-1)} < L_j$$

$$Ek = L_j - L_{(j-1)}$$

$$Dd < Ek$$

where $L_j$ is a distance, measured along the optical axis, from the imaging lens to a jth imaging position, Ek is a difference between distances, measured along the optical axis, from adjacent imaging positions to the imaging lens, and Dd is an image-side depth of an optical system of the imaging section, the imaging section further has means for adjusting the difference Ek between distances, measured along the optical axis, from adjacent imaging positions to the imaging lens, the observing section has an eyepiece optical system and i display devices and displays an image formed at the jth imaging position from the imaging lens of the imaging section on a jth display device from the eyepiece optical system, satisfying the following condition:

$$M_j < M_{(j-1)}$$

where $M_j$ is a distance, measured along the optical axis, from the eyepiece optical system to the jth display device, the observing section further has means for superimposing i displayed images on the viewer's pupil, and a difference between distances, measured along the optical axis, from adjacent display devices to the eyepiece optical system, $Fk = M_{(j-1)} - M_j$, is set so that absolute values of a longitudinal magnification and a lateral magnification of the optical system of the imaging section become equal, where i is an integer of 2 or more, j is an integer satisfying conditions, $1 \leq j \leq i$ and $j \geq 2$, and $k = j - 1$.

* * * * *